United States Patent
Hauf

(10) Patent No.: US 7,327,110 B2
(45) Date of Patent: Feb. 5, 2008

(54) DRIVE CIRCUIT FOR BRAKING A MOTOR DURING A MALFUNCTION

(75) Inventor: Ronald Hauf, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 549 days.

(21) Appl. No.: 10/719,615

(22) Filed: Nov. 21, 2003

(65) Prior Publication Data

US 2004/0145328 A1 Jul. 29, 2004

(30) Foreign Application Priority Data

Nov. 22, 2002 (DE) ................. 102 54 608

(51) Int. Cl.
*H02K 7/10* (2006.01)

(52) U.S. Cl. .............. 318/372; 318/371; 318/362; 318/376; 318/783; 318/757

(58) Field of Classification Search ............... None
See application file for complete search history.

(56) References Cited

U.S. PATENT DOCUMENTS

| 4,074,176 | A | | 2/1978 | Parke et al. | |
|---|---|---|---|---|---|
| 5,333,706 | A | * | 8/1994 | Mori | 188/156 |
| 6,213,571 | B1 | * | 4/2001 | Yamada et al. | 303/152 |
| 6,531,839 | B1 | * | 3/2003 | Shin et al. | 318/371 |

* cited by examiner

*Primary Examiner*—Lincoln Donovan
*Assistant Examiner*—Renata McCloud
(74) *Attorney, Agent, or Firm*—Henry M. Feiereisen; Ursula B. Day

(57) ABSTRACT

A drive system with an electric motor is described, which includes an integrated armature short-circuit brake and a mechanical brake. If the electric motor cannot be controllably slowed down, a control signal is applied at an activation time to the integrated armature short-circuit brake and the mechanical brake, and the armature short-circuit brake is switched off when reaching a thermal load limit for the electric motor or the control electronics.

10 Claims, 2 Drawing Sheets

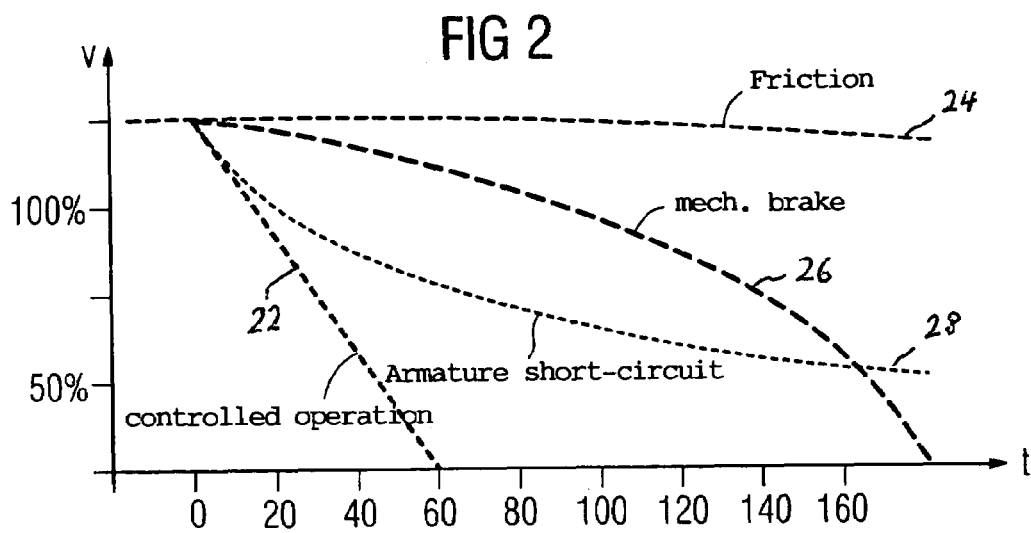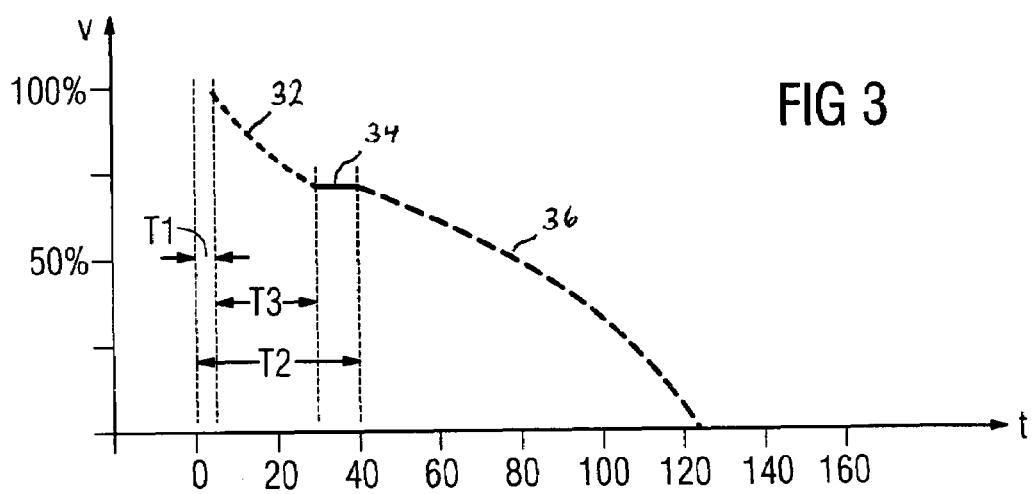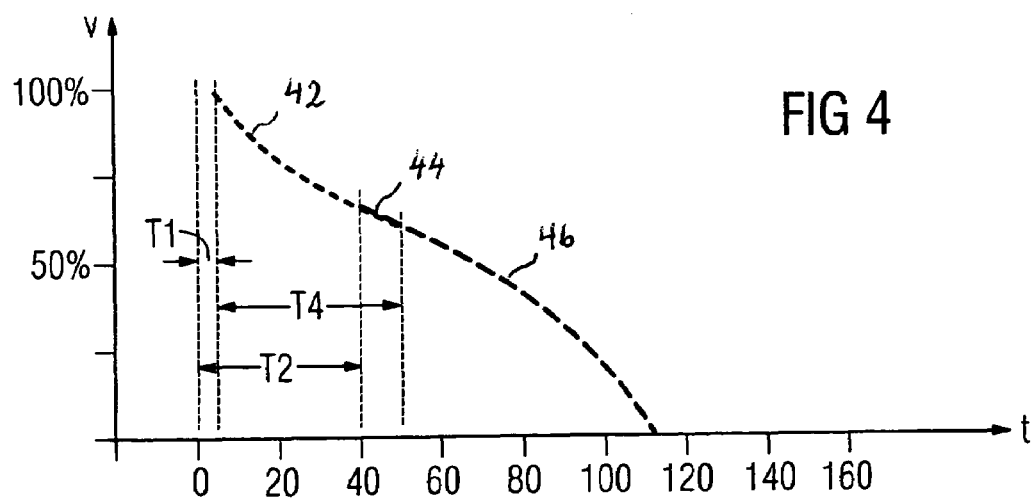

DRIVE CIRCUIT FOR BRAKING A MOTOR DURING A MALFUNCTION

CROSS-REFERENCES TO RELATED APPLICATIONS

This application claims the priority of German Patent Application, Serial No. 102 54 608.8, filed Nov. 22, 2002, pursuant to 35 U.S.C. 119(a)-(d), the disclosure of which is incorporated herein by reference.

BACKGROUND OF THE INVENTION

The present invention relates to a drive assembly with an electric motor, and more particularly to an electric motor that can be stopped immediately at any time in the event of a malfunction of the drive circuitry.

An electric motor should be stopped immediately when a controlled operation of the electric motor is no longer possible. A drive may malfunction for failure to receive drive pulses. The drive then lacks a torque and can therefore no longer be controlled to operate as a generator brake. In such situations, the kinetic energy stored in the drive and the coupled mechanism can put people at risk or damage machine parts. However, drive systems of the afore-described type are typically provided with additional features designed to stop the electric motor and the connected mechanical components. On one hand, the motor can be braked mechanically by applying a mechanical brake. Such brakes normally operate on vertical axles of machines and oftentimes also on horizontal axles. Service brakes and/or holding brakes can be provided depending on the application. Service brakes have a significantly greater braking torque than holding brakes. With linear axles, service brakes are predominantly attached directly to the load, whereas holding brakes typically form an integral component of the motor.

The effective braking torque of mechanical brakes typically increases with decreasing motor speed. Mechanical brakes are also known to have a relatively long delay time, i.e., a time in the order of 40 milliseconds can pass from the command to apply the brake until the brake actually engages.

Drive systems of the afore-described type can also include an armature short-circuit brake. An armature short-circuit brake can be implemented by using external components, for example components controlled by a relay. The armature short-circuit brake can also be an integral component of a motor controller, as disclosed for example in European patent publication EP 0 742 637.

An armature short-circuit brake typically has a high braking torque at a high motor speed, while providing only a limited braking action at a low motor speed. The effective braking torque therefore decreases with decreasing motor speed. However, an armature short-circuit brake typically has a fast reaction time, so that an integrated electronic armature short-circuit can achieve a reaction time of only 5 milliseconds.

It would therefore be desirable and advantageous to provide an improved drive system with an electric motor, which obviates prior art shortcomings and is able to quickly brake the motor and/or drive system without placing a burden on the motor components and the control electronics.

SUMMARY OF THE INVENTION

According to one aspect of the present invention, a drive system with an electric motor includes an integrated armature short-circuit brake having a first inherent delay time, a mechanical brake having a second inherent delay time which is longer that the first inherent delay time, and a controller applying a control signal to the integrated armature short-circuit brake and the mechanical brake at an activation time for immediately stopping the electric motor in the absence of a controllable slow-down of the electric motor. The armature short-circuit brake is disengaged when a thermal load limit for the electric motor or the controller has been reached.

According to another aspect of the invention, a method is disclosed for instantaneously stopping a drive system with an electric motor in the absence of a controllable slowdown of the electric motor. The drive system including an integrated armature short-circuit brake having a first inherent delay time and a mechanical brake having a second inherent delay time which is longer that the first inherent delay time. The method includes the steps of applying at an activation time a control signal to the integrated armature short-circuit brake and the mechanical brake, and disengaging the armature short-circuit brake when a thermal load limit for the electric motor or its control electronics is reached.

According to an advantageous feature of the invention, the thermal load limit is defined by the maximum current and/or by the product of the current and a reaction time and/or by the reaction time alone and/or the system temperature. The system parameters can be easily measured and stored, for example in a table format in a memory of the controller. The stored parameters can the be used to terminate an actual armature short-circuit.

According to another advantageous feature of the invention, the duration of the braking operation can be shortened further, if personnel or the environment at risk, by keeping the armature short-circuit brake engaged, i.e. by delaying disengagement of the short-circuit brake; however, such delay may cause equipment and/or other property damage.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a graphical illustration depicting the motor speed as a function of time for different braking processes, FIG. 3 is a graphical illustration of a first braking profile according to the invention, and FIG. 4 is a graphical illustration of a second braking profile according to the invention.

DETAILED DESCRIPTION OF PREFERRED EMBODIMENTS

Figure 1:
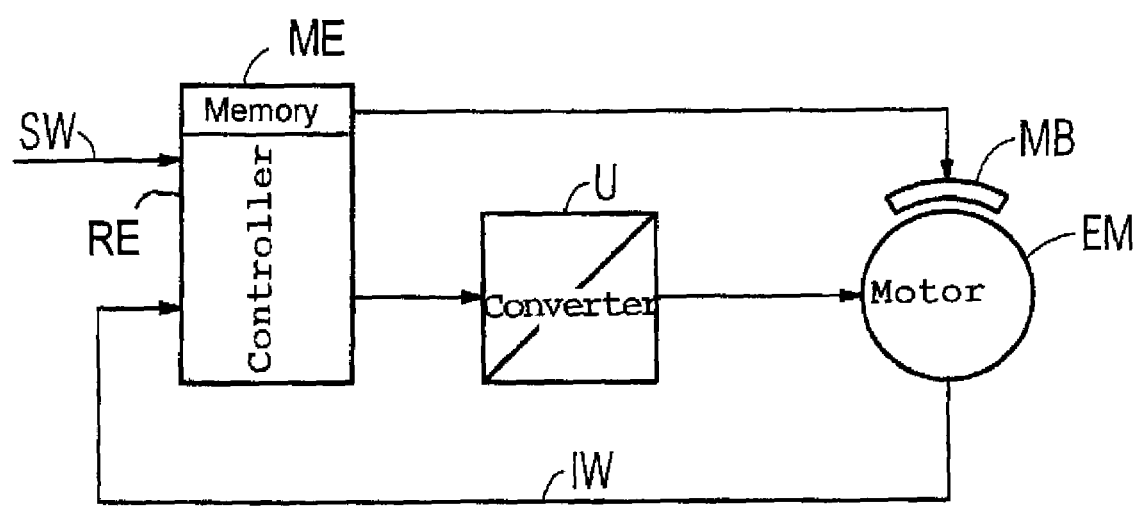
FIG. 1 is a schematic block diagram of a motor drive according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematically an exemplary electric motor EM which is powered by a converter U which is in turn controlled by a controller RE. The electric motor EM is driven according to desired parameter values SW that are applied to the input of the controller RE. The motion parameters of the electric motor EM are measured and fed back to the controller RE as actual motion values IW. The desired parameter values SW can represent a distance, a motor speed and/or an acceleration; however, a desired value SW can also represent the actuation of a mechanical brake MB. For example, the controller RE can initiate a braking action of the mechanical brake MB by applying a signal to a conventional brake controller or actuator (not shown). In addition, the controller RE can cause the converter U to produce an integrated armature short-circuit in the motor.

Referring now to the graphical illustration of FIG. 2, the motor speed for various braking profiles is shown as a function of time. The motor speed v is here defined as a percentage value, with 100% representing an initial value at a time "0". Different braking profiles are shown at different times t in a time interval between zero and 180 milliseconds. For example, the curve 22 indicates that the motor speed can be decreased from 100% to 0% within 60 milliseconds under controlled operating conditions of the drive, i.e. the reaction times can be extremely short under controlled operating conditions. However, the present invention addresses situations where a controlled operation is no longer possible due to a malfunction.

As indicated by the curve 24 in FIG. 2, if no external brake is applied at the time "0", friction in the system alone would slow the motor speed only to approximately 95% of the original motor speed after 180 milliseconds.

As indicated by the curve 26 in FIG. 2, applying only a mechanical brake at time "0" would reduce the motor speed to zero, i.e., bring the motor to a stop, after approximately 180 milliseconds. As can be seen from curve 26, the mechanical brake is very effective at a low motor speed, but rather ineffective at a relatively high motor speed.

The curve 28 in FIG. 2 indicates the braking effect of an armature short-circuit of the drive system. Curve 28 clearly shows that the integrated armature short-circuit is unable to bring the system to a halt after 180 milliseconds, when the system still retains approximately 25% of the original motor speed. However, the integrated armature short-circuit brakes very effectively at a relatively high motor speed.

FIG. 2 represents a comparison of the motor speed vs. time curves for the different braking processes. A braking operation is characterized by the time dependence and the reaction time. As clearly seen in FIG. 2, an integrated armature short-circuit is already effective after approximately 5 milliseconds, whereas a mechanical brake becomes effective after approximately 40 milliseconds.

Referring now to FIG. 3, the different braking processes can be suitably combined to produce a first advantageous braking profile according to the invention. It will be assumed that a mechanical system initially has a motor speed v of 100%. In the event of a malfunction when the motor speed can no longer be controlled, for example at time "0", the initiation of a braking command causes a mechanical brake and the integrated armature short-circuit to engage. After 5 milliseconds, i.e. after a delay time T1, the integrated armature short-circuit starts to brake the drive, as indicated by curve 32. The armature short-circuit is switched off after 25 milliseconds, i.e. after a time interval T3. The time interval T3 is typical determined by the load limit of motor and/or converter, whereby these parameters can be either measured directly or obtained empirically by other means. For example, the parameters can be measured before the drive unit is put into service and can be stored in a memory ME (see FIG. 1) which can be part of the controller RE. The drive then runs without an applied brake at an essentially time-independent motor speed until the mechanical braking operation is initiated after a time interval T2, as indicated by curve 34 between the end of the time interval T2 and the time interval T3. The mechanical brake engages after the time interval T2 and brings the system to a halt approximately 125 milliseconds after receiving the initial braking command (curve 36). The aforementioned system-related friction has been neglected, except in curve 34, since the friction torque is small compared to the torque generated by the other braking processes.

FIG. 4 shows another braking profile according to the invention, wherein the integrated armature short-circuit is applied for a longer time duration than in the previous example described with reference to FIG. 3. The duration of the time interval T4 is here assumed to be about 45 milliseconds, so as to extend beyond the end of the time interval T2. Accordingly, the integrated armature short-circuit (curve 42) remains switched on for 5 milliseconds after the mechanical brake is engaged. This results in an overlapping or "dual" braking effect, as indicated by curve 44, between the end of time interval T2 and the end of time interval T4, whereafter the mechanical brake takes over (curve 46). The absence of a "braking gap" improves the braking characteristics over that shown in the previous example (FIG. 3), so that the electric motor and the connected mechanical system can be stopped after approximately 110 milliseconds.

It should be emphasized that the electric motor can also be braked by applying a DC voltage, which however requires a special design of the converter. In addition, additional external hardware is required for applying the DC voltage.

The present invention obviates the need for additional components, so that already existing converters can be employed in an integrated armature short-circuit brake system.

Depending on the safety requirements, a number of additional safety measures can be employed in combination with the present invention for testing electronics and the mechanical components.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive control system for braking an electric motor, comprising:
   an integrated armature short-circuit brake having a first delay time,
   a mechanical brake having a second delay time which is longer that the first delay time, and a controller simultaneously applying a control signal to the integrated armature short-circuit brake and the mechanical brake at an activation time for immediately stopping the electric motor in the event of a malfunction which prevents a controlled slow-down of the electric motor, wherein the armature short-circuit brake is disengaged when a thermal load limit for the electric motor or the controller has been reached.

2. The drive system of claim 1, wherein the thermal load limit is defined by at least one parameter selected from the group consisting of a maximum current, a product of a current and a reaction time, a reaction time and a system temperature.

3. The drive system of claim 2, wherein the at least one parameter is stored in a memory of the controller.

4. The drive system of claim 1, wherein the armature short-circuit brake remains engaged if a danger for personnel or surroundings is detected.

5. A method for instantaneously stopping an electric motor powered by a drive system in the event of a malfunction which prevents a controlled slowdown of the electric motor, comprising the steps of:

detecting the malfunction, simultaneously applying at an activation time a control signal to an integrated armature short-circuit brake and a mechanical brake, and disengaging the armature short-circuit brake when the electric motor or its control electronics reach a thermal load limit.

6. The method of claim 5, wherein the thermal load limit is defined by at least one parameter selected from the group consisting of a maximum current, a product of a current and a reaction time, a reaction time and a system temperature.

7. The method of claim 6, and further comprising the step of storing the at least one parameter in a memory.

8. The method of claim 5, wherein said disengaging step is postponed if a danger for personnel or surroundings is detected.

9. The method of claim 5, wherein the integrated armature short-circuit brake comprises a converter connected to an armature of the electric motor, with the controller applying the control signal to the converter so as to short-circuit the armature of the electric motor.

10. The method of claim 5, wherein the integrated armature short-circuit brake is formed by operating a converter so as to short-circuit an armature of the electric motor.

* * * * *